United States Patent Office 2,981,695
Patented Apr. 25, 1961

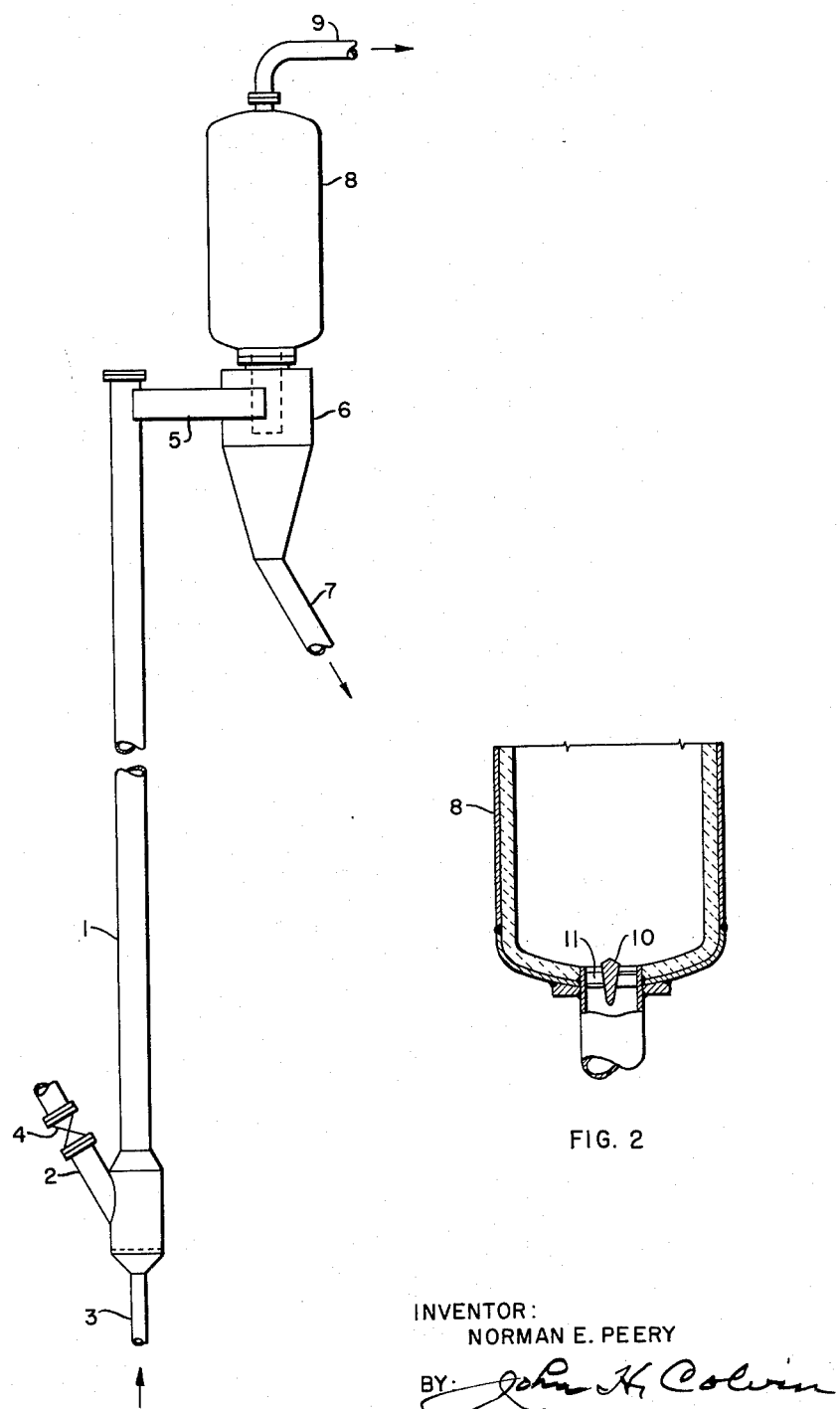

2,981,695

REGENERATION OF CARBONIZED FINELY DIVIDED CONTACT AGENTS

Norman E. Peery, San Francisco, Calif., assignor to Shell Oil Company, a corporation of Delaware Filed June 20, 1957, Ser. No. 666,911

1 Claim. (Cl. 252—417)

This invention relates to the regeneration of finely divided contact agents whose activity is impaired by carbonaceous materials deposited during a previous period of use. The invention relates more particularly to the regeneration of such contact agents by controlled burning of carbonaceous deposits from the spent material in a particular manner.

In most reactions or treatments of various carbonaceous materials at relatively elevated temperatures with solid contact agents the contact agent gradually becomes deactivated through deposition of tarry to coke-like carbonaceous deposits. In such cases it is advantageous to use the contact agent in a finely divided (powdered) form and apply the so-called fluid catalyst technique, since the contact agent can then be easily and continuously transferred from the treating zone to a separate zone wherein it may be regenerated by burning off the deactivating deposits. This system is applicable for a wide range of catalytic conversions or treatments with a wide variety of known catalysts. The best known and most widely used application is in various conversions of hydrocarbon oils in which cases the catalyst is applied either in the form of a ground powder or spray dried microspheres passing for the most part a U.S. standard 100 mesh sieve. Examples are catalytic cracking, isomerization and reforming. In the normal operation the catalyst is passed as a continuous stream into a separate regeneration vessel called a regenerator and a like stream of regenerated catalyst is continuously withdrawn from the regenerator and passed to the treating zone. Air is normally used to supply the oxygen for the combustion and at the same time maintain the contact material undergoing regeneration in a mobile fluid condition. The pressure may vary from atmospheric up to several hundred pounds per square inch depending upon the particular conversion or treatment in question. The flue gas resulting from the regeneration normally contains some unburned gases including carbon monoxide and usually a small amount of unconsumed oxygen.

In effecting regeneration in this manner the control of the temperature has been considered to be very important. The temperature in the regeneration must, of course, be sufficiently high to allow the combustion to proceed e.g., above about 650° F., but must not be sufficiently high to appreciably damage the catalyst by overheating. A curious observed anomaly however is that in order to avoid damage to the catalyst in commercial regeneration it has been necessary to maintain the temperature considerably below that which the catalyst easily withstands in laboratory heating tests. Th reason for this difference is due to the phenomenon known as afterburning. The gases leaving the fluidized catalyst undergoing regeneration normally contain appreciable concentrations of combustible gas e.g., CO and hydrocarbon vapors, and also a small amount of unconsumed oxygen. In the fluidized bed there is sufficient solid of high heat capacity that the danger of overheating is absent. In the space above the catalyst bed however where the concentration of the solid is low, further reaction (burning) of the combustible gases can be initiated and if once initiated it continues at an increased rate. This gas burning is known as afterburning. If it is not controlled the temperature rises sharply and the apparatus as well as the catalyst is damaged. The tendency for afterburning to take place depends primarily upon the nominal regeneration temperature, the concentration of oxygen in the gas, and upon the particular catalyst in question. In commercial practice afterburning is prevented with any given catalyst by controlling one or both of the first two factors. Thus, it is the practice to employ a large bed of the catalyst and supply the air at such a rate that only a very small amount of oxygen remains in the flue gas. In catalytic cracking, for instance, where large fluid beds of catalyst are used and the oxygen content of the flue gas is retained around 1% maximum the temperature may be around 1135–1150° F.

If afterburning sets in it is the practice to immediately stop it by injecting a water spray. This is to be avoided if possible, however, because of the deactivating effects of the steam and poisoning by traces alkalies contained in the water.

It is thus seen that the difficulties due to afterburning limit regeneration rate which can be applied. According to the method of the present invention this limitation is removed. Afterburning, instead of being avoided or prevented, is allowed to take place in a separate zone where it can do no harm and in fact can be used to advantage. Briefly stated, the regeneration according to the present invention is carried out under particular conditions in a riser regenerator which discharges directly into a cyclone separator. The spent catalyst is supplied to the riser regenerator in such quantity that it occupies from 10 to 25 volume percent in the regeneration zone, and the air is supplied in such an amount that there is at least 5% free oxygen in the gases leaving the cyclone separator. By maintaining the specified concentration of solid in the regeneration zone damage from overheating is avoided and higher temperatures affording faster burning rates can be applied. Also the burning rate is directly proportional to the mean partial pressure of oxygen and under these conditions the mean partial pressure of oxygen can be much increased over those hitherto applicable thereby further increasing the regeneration rate. Due to the method of handling, the catalyst is quickly separated from the regeneration gas before afterburning can set in. The hot gases are then passed to a separate zone where afterburning can take place without damage to the equipment or catalyst.

The process of the invention will be explained in connection with the accompanying drawing which illustrates one form of suitable apparatus. Figure 1 is a semidiagrammatic elevational view and Figure 2 shows a detail of the entrance to the afterburner. Referring to the drawing the spent contact material containing carbonaceous deposits is continuously fed to the bottom of the riser regenerator 1 by line 2. The spent contact material is ordinarily coming from a reaction zone or stripping zone (not shown) and is ordinarily sufficiently hot to support combustion upon contact with air, e.g., at least 650° F. and generally around 800 to 950° F. Air is supplied to the riser regenerator by line 3 at the bottom. The air disperses the contact material and carries it up thru the riser regenerator. The amount of spent contact material supplied is adjusted by valve 4 such that the solid content occupies between about 10 and 25 volume percent in the regeneration zone. This is essential. The riser regenerator, which includes the side arm 5 (a bend instead of a square elbow may be used), discharges directly into a cyclone separator 6. The velocity at the cyclone entrance is between about 25 and 55 feet per second. The solids are very quickly separated from the gas in the cyclone separator and are withdrawn by line 7 which is normally retained substantially full of the fluidized solid. The amount of air supplied to the regenerator is adjusted such that the flue gas leaving the cyclone contains at least 5% oxygen. Typical gas compositions for the regeneration of spent silica-alumina cracking catalyst are shown in the following table.

| Test Run | B | C | D | K |
|---|---|---|---|---|
| Carbon on spent catalyst, percent wt. | 0.38 | 0.49 | 0.41 | 0.19 |
| Carbon on regenerated catalyst, percent wt. | 0.23 | 0.36 | 0.22 | 0.10 |
| Oxygen partial pressure (ln mean) kg./cm.$^2$ | 0.144 | 0.152 | 0.168 | 0.179 |
| Steam partial pressure (ln mean) kg./cm.$^2$ | 0.517 | 0.498 | 0.475 | 0.540 |
| Flue gas composition (dry basis): | | | | |
| $N_2$ percent vol. | 82.4 | 83.3 | 82.1 | 82.6 |
| $O_2$ percent vol. | 5.2 | 5.5 | 6.9 | 9.3 |
| $CO_2$ percent vol. | 6.4 | 5.6 | 5.6 | 4.1 |
| CO percent vol. | 6.0 | 5.6 | 5.4 | 4.0 |

It will be noted that in these runs steam was applied with the air (approximately ⅓ amount of air) and that the gas compositions are those of the gas leaving the cyclone separator and before afterburning has started.

The gas leaving the cyclone is passed to chamber 8 which is built to withstand the higher temperature caused by the afterburning. The gas velocity in the cyclone overflow is normally above the flame propagation velocity. Moreover the gases passing up through the overflow line are swirling at a high velocity in a nearly horizontal plane. Upon entering the chamber 8 the gas whirls in a double vortex, i.e., aside from the swirl in the horizontal path a second swirl is produced which sucks the burning gases back toward the inlet along the center line. This flame pattern which is described in copending application Serial No. 446,256, filed July 28, 1954, now U.S. Patent No. 2,806,517, allows the burning to be completed in a small space. The flame is held near the inlet even at quite high gas velocities. Thus a large chamber is not necessary.

In order to insure that the gas enters at a velocity above the flame propagation velocity a small insert may be placed in the throat as illustrated by insert 10 in Figure 2. The insert 10 may be supported by vanes 11 which may be provided and placed at an angle to increase the swirl. The temperature in chamber 8 will depend upon the amount of combustible material in the gases but is in any case at least 100° F. above that in the regenerator. The flue gas withdrawn by line 9 may be vented or utilized in any desired manner, e.g., passed to a heat economizer (not shown).

The maximum temperature employed in the regeneration zone will depend on the particular catalyst in question. In the case of high alumina silica alumina cracking catalyst, for instance, temperatures up to about 1400° F. can be applied. In the case of catalysts consisting of vanadium oxide deposited on alumina even somewhat higher temperatures may be applied.

By effecting the regeneration in the manner described the burning rate is much higher than in conventional operations, firstly because of the much larger mean oxygen partial pressure and secondly because the higher temperatures may be employed without damage due to afterburning.

I claim as my invention:

In a process for the continuous regeneration of a finely divided solid catalyst contaminated with carbonaceous deposits by burning carbonaceous contaminants from the catalysts with air, the improvement permitting an increased burning rate without the occurrence of afterburning in the presence of the catalyst which comprises continuously feeding spent catalyst to be regenerated to the bottom of a riser line regeneration zone which debouches tangentially into a centrifugal separation zone, continuously supplying air to the bottom of said riser line regeneration zone whereby the finely divided catalyst is suspended in the air and carried up through the riser regeneration zone and into said centrifugal separation zone, the rate of supplying said spent catalyst being adjusted such that the finely divided solid catalyst occupies between about 10 and 25% of the volume throughout the riser line regeneration zone and the air rate being adjusted such that the flue gas leaving the separation zone contains at least 5% oxygen on a dry basis, withdrawing regenerated catalyst from said centrifugal separation zone and passing the gas separated in said centrifugal separation zone at a velocity above the flame propagation velocity in said gas to a separate zone wherein burning takes place in the substantial absence of suspended catalyst.

References Cited in the file of this patent

UNITED STATES PATENTS

| | | |
|---|---|---|
| 2,322,075 | Tyson | June 15, 1943 |
| 2,409,751 | Gerhold et al. | Oct. 22, 1946 |
| 2,425,849 | Voorhees | Aug. 19, 1947 |
| 2,495,786 | Strader | Jan. 31, 1950 |